United States Patent [19]

Reddy et al.

[11] Patent Number: 5,783,106
[45] Date of Patent: Jul. 21, 1998

[54] LITHIUM DOPED TERBIUM ACTIVATED GADOLINIUM OXYSULFIDE PHOSPHOR

[75] Inventors: Vaddi Butchi Reddy; Shellie K. Northrop, both of Sayre, Pa.

[73] Assignee: Osram Sylvania Inc., Danvers, Mass.

[21] Appl. No.: 935,645

[22] Filed: Sep. 23, 1997

[51] Int. Cl.⁶ .................................................. C09K 11/84
[52] U.S. Cl. .............................. 252/301.45; 252/301.4 R
[58] Field of Search ........................ 252/301.45, 301.4 R

[56] References Cited

U.S. PATENT DOCUMENTS 3,856,698  12/1974  Nath ................................ 252/301.4 S
5,387,836   2/1995  Adachi et al. ........................ 313/468

*Primary Examiner*—Melissa Bonner
*Attorney, Agent, or Firm*—Robert F. Clark

[57] ABSTRACT

The brightness of small size terbium activated gadolinium oxysulfide ($Gd_{2-x}Tb_xO_2S$) phosphor is increased by the incorporation of a lithium dopant. The lithium dopant is added to the phosphor by mixing lithium phosphate with the raw materials formulated to make the phosphor.

20 Claims, No Drawings

LITHIUM DOPED TERBIUM ACTIVATED GADOLINIUM OXYSULFIDE PHOSPHOR

TECHNICAL FIELD

This invention relates to gadolinium oxysulfide phosphors. More particularly, this invention relates to small size terbium activated gadolinium oxysulfide phosphors and methods of making them.

BACKGROUND ART

Small particle size phosphors, such as terbium activated gadolinium oxysulfide, are used in high resolution x-ray intensifier screens for medical radiography. In particular, x-ray intensifier screens prepared from small size terbium activated gadolinium oxysulfide phosphors (2.0–4.5 micrometers, μm) yield ultrahigh resolution images which are vital to important diagnostic applications such as mammography.

In addition to having a small particle size, brightness is also a key characteristic. Higher brightness phosphors can reduce the amount of x-ray exposure needed to generate x-ray images leading to lower radiation dosages for patients. Thus, it would be an advantage to be able to produce higher brightness, small particle size terbium activated gadolinium oxysulfide phosphors.

SUMMARY OF THE INVENTION

It is an object of the invention to obviate the disadvantages of the prior art.

It is another object of the invention to provide higher brightness small size terbium activated gadolinium oxysulfide phosphors.

It is a further object of the invention to provide higher brightness, small size terbium activated gadolinium oxysulfide phosphors without substantially increasing particle size.

In accordance with one aspect the invention, there is provided a terbium activated gadolinium oxysulfide phosphor having an amount of a lithium dopant.

In accordance with another aspect of the invention, the amount of the lithium dopant is sufficient to increase brightness without substantially increasing particle size.

In accordance with a further aspect of the invention, there is provided a method of increasing the brightness of a terbium activated gadolinium oxysulfide phosphor. The method involving incorporating an amount of a lithium dopant into the phosphor.

DESCRIPTION OF THE PREFERRED EMBODIMENTS

For a better understanding of the present invention, together with other and further objects, advantages and capabilities thereof, reference is made to the following disclosure and appended claims.

We have discovered that the brightness of terbium activated gadolinium oxysulfide phosphors can be increased by doping the phosphor with a small amount of lithium. The increase in brightness is achieved without substantially increasing the particle size of the phosphor, i.e., no more than a 20% increase in the particle size. Thus, the advantages of a small size phosphor are preserved while the brightness is improved. The preferred terbium activated gadolinium oxysulfide phosphors have the general formula $Gd_{2-x}Tb_xO_2S$ where x is from about 0.0001 to about 0.20. However, other useful terbium activated gadolinium oxysulfide phosphors may contain additional activators, such as dysprosium, cerium and europium, and have a wider range of terbium concentrations. The preferred amount of the lithium dopant incorporated into the phosphor is from about 1 ppm to about 500 ppm, and more preferably from about 1 ppm to about 3 ppm.

The lithium dopant is incorporated into the phosphor by adding a lithium-containing compound, such as lithium phosphate, to the mixture of raw materials formulated to make the phosphor. A small amount of lithium is retained by the phosphor after the raw material mixture is processed into the phosphor. Preferably, the amount of lithium phosphate added to the raw material mixture is from about 0.05 to about 0.15 moles per mole phosphor. While only a portion of the lithium added to the raw material mixture is incorporated into the phosphor, one skilled in the art can empirically determine the amount of the lithium-containing compound needed to produce the desired lithium concentration in the phosphor.

The following non-limiting examples are presented.

EXAMPLES 1–5

The raw material amounts used in the examples are given in Table 1. Each small size terbium activated gadolinium oxysulfide phosphor (x=0.002) was prepared by weighing out and mixing the amounts of gadolinium oxide ($Gd_2O_3$), sulfur (S), sodium carbonate ($Na_2CO_3$), and sodium hydrogen phosphate ($Na_2HPO_4$), into a 32 oz. plastic bottle. To this, 1000 g of 5 mm yttria stabilized zirconia (YTZ) milling media were added and the mixture roll milled for 30 minutes at 44 rpm (bottle). A 150 g portion of the mixture was transferred into a 0.5 l plastic bottle and the amounts of lithium phosphate ($Li_3PO_4$), terbium oxide ($Tb_4O_7$), and ammonium hexafluorophosphate ($NH_4PF_6$), were added and hand mixed together. About 450 g of YTZ milling media was added and the contents of the second bottle were roll milled for 30 minutes. The entire contents of the second bottle were transferred back into the first bottle and roll milled for 1 hour. The blended material was then sieved through a 20 mesh stainless steel sieve to remove the milling media and then re-blended on the roller mill for another ½ hour without the milling media.

TABLE 1

| Chemical | Moles/mole phosphor | Example 1 (control) | Example 2 | Example 3 | Example 4 | Example 5 |
|---|---|---|---|---|---|---|
| $Gd_2O_3$ | 0.998 | 361.78 g | 361.78 g | 361.78 g | 361.78 g | 361.78 g |
| Sulfur | 3.0 | 96.18 g | 96.18 g | 96.18 g | 96.18 g | 96.18 g |
| $Na_2CO_3$ | 1.5 | 159.0 g | 159.0 g | 159.0 g | 159.0 g | 159.0 g |
| $Na_2HPO_4$ | 0.5 | 71.0 g | 71.0 g | 71.0 g | 71.0 g | 71.0 g |
| $Tb_4O_7$ | 0.001 | 0.748 g | 0.748 g | 0.748 g | 0.748 g | 0.748 g |

TABLE 1-continued

| Chemical | Moles/mole phosphor | Example 1 (control) | Example 2 | Example 3 | Example 4 | Example 5 |
|---|---|---|---|---|---|---|
| $NH_4PF_6$ | 0.003334 | 0.543 g | 0.543 g | 0.543 g | 0.543 g | 0.543 g |
| $Li_3PO_4$ | (variable) | — (0.0) | 11.58 g (0.10) | 5.79 g (0.05) | 11.58 g (0.10) | 17.37 g (0.15) |

The mixture was compacted into a 500 ml alumina crucible and the crucible inserted into a small covered carrier crucible in order to create a contained environment to minimize oxidation during firing. Both inner and outer crucibles were covered with lids and fired in a gas furnace at 1125° C. for 2 hours. After firing, the crucibles were taken out and cooled at room temperature. The fired cake was crushed and soaked in 350 ml of hot deionized (DI) water for at least 6 hours while periodically agitating. The material was then wet milled with 2000 g of 5 mm YTZ milling media for 1 hour at 80 rpm in a 0.5 gal plastic bottle and the particle size measured. If necessary, milling was continued and the particle size of the material monitored in 0.25 hour increments until the particle size was 3.6±0.2 µm. Once the fired material was milled to size, it was washed with 4 l volumes of DI water until the conductivity of the wash solution was less than 10 µS/cm (7–10 washes). Hot (approx. 60°–65° C.) DI water was used for the first two washes and a 50/50 hot/cold(approx. 25° C.) mixture of DI water was used for latter washes. The material was allowed to settle for 2 hours between each wash. The washed material was filtered and dried at 120° C. for 4–6 hours. The dried powder was sieved to −160 mesh and annealed in long silica boats at 500° C. for 2 hours. The bed depth was maintained to less than 1.3 cm. The annealed phosphor was sieved to −400 mesh and analyzed for x-ray optical fluorescence (XOF) brightness, particle size (sonic Coulter Counter), and elemental composition (lithium) by glow discharge mass spectrometry (GDMS). The results of the analyses are presented in Table 2. XOF brightness was measured relative to a standard terbium activated gadolinium oxysulfide phosphor having a 50% sonic Coulter Counter particle size of 3.47 µm.

TABLE 2

| Example | $Gd_2O_3$ Particle Size (µm) | $Li_3PO_4$ (mole ratio) | Li conc. in phosphor (ppm) | Rel. XOF Brightness | 50% sonic Coulter Counter Size (µm) |
|---|---|---|---|---|---|
| 1 (control) | 2.65 | 0.00 | <0.1 | 101 | 3.52 |
| 2 | 2.65 | 0.10 | 1.7 | 102 | 3.99 |
| 3 | 1.52 | 0.05 | 1 | 108 | 3.57 |
| 4 | 1.52 | 0.10 | 1.7 | 113 | 3.63 |
| 5 | 1.52 | 0.15 | 3 | 117 | 3.93 |

The results in table 2 show that between 1 and 3 ppm Li were incorporated into the phosphor by adding between 0.05 and 0.15 moles/mole phosphor of lithium phosphate to the raw material mixture. Example 2 exhibited a slight increase in the relative XOF brightness compared to Example 1 (no Li). The improvement in brightness effected by the Li dopant was more pronounced in Examples 3–5 which used a smaller gadolinium oxide starting material. Particle size was increased only slightly by the Li addition. At most the particle size increased about 13% between examples 1 and 2.

While there has been shown and described what are at the present considered the preferred embodiments of the invention, it will be obvious to those skilled in the art that various changes and modifications may be made therein without departing from the scope of the invention as defined by the appended claims.

We claim:

1. A terbium activated gadolinium oxysulfide phosphor having an amount of a lithium dopant.

2. The phosphor of claim 1 wherein the amount of the lithium dopant in the phosphor is from about 1 ppm to about 500 ppm.

3. The phosphor of claim 1 wherein the amount of the lithium dopant in the phosphor is from about 1 ppm to about 3 ppm.

4. The phosphor of claim 1 wherein the phosphor has the general formula $Gd_{2-x}Tb_xO_2S$ where x is from about 0.0001 to about 0.20.

5. The phosphor of claim 4 wherein the amount of the lithium dopant in the phosphor is from about 1 ppm to about 500 ppm.

6. The phosphor of claim 4 wherein the amount of the lithium dopant in the phosphor is from about 1 ppm to about 3 ppm.

7. The phosphor of claim 6 wherein x is 0.002.

8. A terbium activated gadolinium oxysulfide phosphor having an amount of a lithium dopant, the amount of the lithium dopant being sufficient to increase brightness without substantially increasing particle size.

9. The phosphor of claim 8 wherein the amount of the lithium dopant in the phosphor is from about 1 ppm to about 500 ppm.

10. The phosphor of claim 8 wherein the amount of the lithium dopant in the phosphor is from about 1 ppm to about 3 ppm.

11. The phosphor of claim 8 wherein the phosphor has the general formula $Gd_{2-x}Tb_xO_2S$ where x is from about 0.0001 to about 0.20.

12. The phosphor of claim 11 wherein the amount of the lithium dopant in the phosphor is from about 1 ppm to about 500 ppm.

13. The phosphor of claim 11 wherein the amount of the lithium dopant in the phosphor is from about 1 ppm to about 3 ppm.

14. The phosphor of claim 13 wherein x is 0.002.

15. A method of increasing the brightness of a terbium activated gadolinium oxysulfide phosphor comprising: incorporating an amount of a lithium dopant into the phosphor.

16. The method of claim 15 wherein the lithium dopant is incorporated in the phosphor by adding an amount of lithium phosphate to a mixture of raw materials formulated to make the phosphor.

17. The method of claim 16 wherein the lithium phosphate is added in an amount from about 0.05 to about 0.15 moles per mole phosphor.

18. The method of claim 15 wherein the phosphor has the general formula $Gd_{2-x}Tb_xO_2S$ where x is from about 0.0001 to about 0.20.

19. The method of claim 18 wherein the lithium dopant is incorporated in the phosphor by adding an amount of lithium phosphate to a mixture of raw materials formulated to make the phosphor.

20. The method of claim 19 wherein the lithium phosphate is added in an amount from about 0.05 to about 0.15 moles per mole phosphor.

* * * * *